United States Patent
Yang et al.

(10) Patent No.: US 8,875,455 B1
(45) Date of Patent: Nov. 4, 2014

(54) RAMP MOUNTING SYSTEM FOR A FLAT ROOF SOLAR ARRAY

(71) Applicant: ZEP Solar LLC, San Rafael, CA (US)

(72) Inventors: Alex Yang, San Mateo, CA (US); Brian West, San Rafael, CA (US); Jack West, San Rafael, CA (US)

(73) Assignee: ZEP Solar, LLC, San Rafael, CA (US)

( * ) Notice: Subject to any disclaimer, the term of this patent is extended or adjusted under 35 U.S.C. 154(b) by 0 days.

(21) Appl. No.: 14/288,878

(22) Filed: May 28, 2014

(51) Int. Cl.
*E04D 13/18* (2014.01)
*F24J 2/52* (2006.01)

(52) U.S. Cl.
CPC ........... *F24J 2/5245* (2013.01); *F24J 2/523* (2013.01); *F24J 2/5264* (2013.01); *F24J 2/52* (2013.01); *F24J 2002/5294* (2013.01)
USPC ............ 52/173.3; 52/410; 126/623; 136/244; 248/205.1

(58) Field of Classification Search
CPC ....... Y02B 10/12; F24J 2/5245; F24J 2/5252; F24J 2002/5294
USPC ............. 52/173.3, 219, 410, 741.4; 411/82.1, 411/82.3, 369, 542; 248/205.1, 237, 248/346.03; 126/623; 136/244
See application file for complete search history.

(56) References Cited

U.S. PATENT DOCUMENTS

| | | | |
|---|---|---|---|
| 4,321,745 A * | 3/1982 | Ford | 29/525.04 |
| 4,371,139 A * | 2/1983 | Clark | 248/237 |
| 4,875,818 A * | 10/1989 | Reinwall | 411/369 |
| 4,928,443 A * | 5/1990 | Goodman et al. | 52/58 |
| 5,143,556 A | 9/1992 | Matlin | |
| 5,316,592 A | 5/1994 | Dinwoodie | |
| 5,505,788 A | 4/1996 | Dinwoodie | |
| 5,746,839 A | 5/1998 | Dinwoodie | |
| 6,021,620 A * | 2/2000 | Vermilion et al. | 52/741.4 |
| 6,046,399 A | 4/2000 | Kapner | |
| 6,809,251 B2 | 10/2004 | Dinwoodie | |
| 6,968,654 B2 | 11/2005 | Moulder et al. | |
| 7,435,897 B2 | 10/2008 | Russell | |
| 7,806,377 B2 | 10/2010 | Strizki | |
| 7,849,849 B2 * | 12/2010 | Genschorek | 126/704 |
| 7,946,082 B2 * | 5/2011 | Ohkoshi et al. | 52/173.3 |
| 7,954,286 B2 * | 6/2011 | Khan et al. | 52/219 |
| 8,272,176 B2 * | 9/2012 | Wallgren | 52/173.3 |
| 8,276,330 B2 * | 10/2012 | Harberts et al. | 52/173.3 |
| D671,885 S * | 12/2012 | Steinau | D13/102 |
| 8,336,277 B1 | 12/2012 | Rego et al. | |
| 8,522,491 B2 * | 9/2013 | Kneip et al. | 52/173.3 |
| 8,733,718 B2 * | 5/2014 | Corsi | 248/205.1 |
| 8,756,881 B2 * | 6/2014 | West et al. | 52/173.3 |
| 2004/0007260 A1 | 1/2004 | Dinwoodie | |

(Continued)

FOREIGN PATENT DOCUMENTS

DE 10 2007 026 819 A1 * 12/2007

*Primary Examiner* — Robert Canfield
(74) *Attorney, Agent, or Firm* — Larry D. Johnson

(57) ABSTRACT

A mounting system for solar modules in which a mounting beam has its opposite ends bent downwardly to form a first and second leg that hold photovoltaic modules at an angle to a flat roof, wherein the first and second legs are screw fastened into a rafter and the bottom ends of the first and second legs are placed into receptacles into which sealant is poured, thereby forming a water-tight seal preventing any water from leaking into the holes formed by the fasteners securing the first and second legs to the building rafters.

20 Claims, 5 Drawing Sheets

(56) References Cited

U.S. PATENT DOCUMENTS

| | | | |
|---|---|---|---|
| 2007/0144575 A1 | 6/2007 | Mascolo et al. | |
| 2007/0151594 A1 | 7/2007 | Mascolo et al. | |
| 2008/0029144 A1 | 2/2008 | Brazier et al. | |
| 2009/0134291 A1* | 5/2009 | Meier et al. | 248/222.14 |
| 2009/0242014 A1 | 10/2009 | Leary | |
| 2010/0011685 A1* | 1/2010 | Janoski et al. | 52/219 |
| 2010/0089390 A1 | 4/2010 | Miros et al. | |
| 2010/0179678 A1 | 7/2010 | Dinwoodie et al. | |
| 2010/0243023 A1* | 9/2010 | Patton et al. | 136/244 |
| 2012/0031019 A1* | 2/2012 | Stearns et al. | 52/173.3 |
| 2012/0079774 A1* | 4/2012 | Stearns et al. | 52/58 |
| 2012/0273029 A1 | 11/2012 | Bragagna et al. | |
| 2013/0291472 A1* | 11/2013 | Sader | 52/543 |
| 2013/0294814 A1* | 11/2013 | Sader | 403/21 |
| 2013/0299655 A1* | 11/2013 | Sader | 248/231.9 |
| 2013/0299659 A1* | 11/2013 | Sader | 248/298.1 |

* cited by examiner

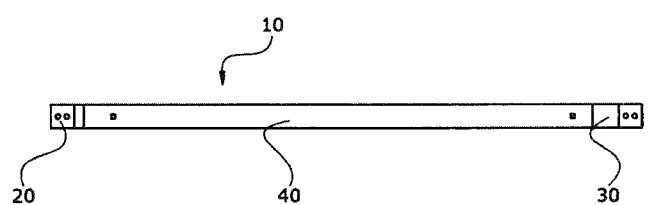
FIG. 4
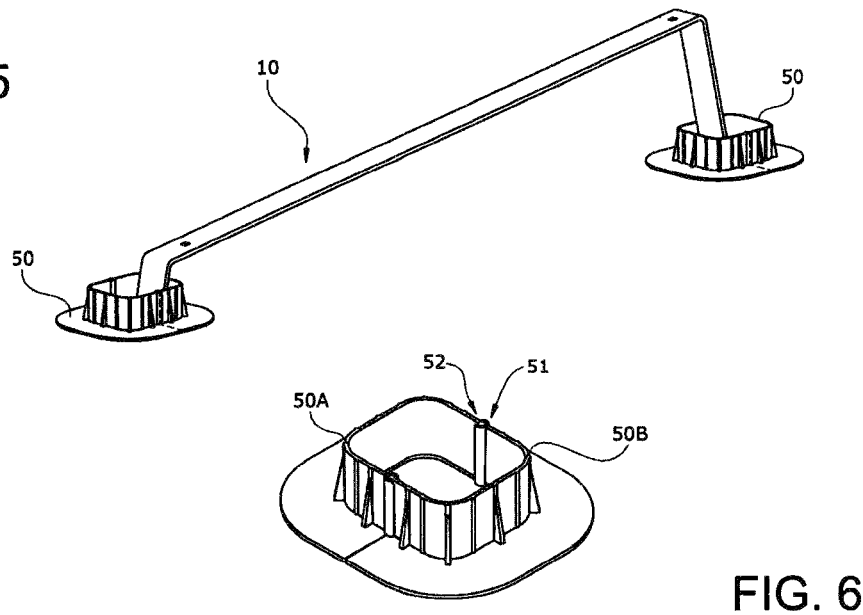
FIG. 5
FIG. 6

RAMP MOUNTING SYSTEM FOR A FLAT ROOF SOLAR ARRAY

TECHNICAL FIELD

The present invention relates to mounting systems for photovoltaic solar panel arrays.

BACKGROUND OF THE INVENTION

Flat roofs are especially common in the southwestern states of the United States. Numerous systems currently exist for mounting arrays of photovoltaic solar modules onto these flat roofs. Unfortunately, existing systems tend to be rather complex and all too often require a considerable amount of time to install. A common example of an existing system is the "pipe racking system" in which the photovoltaic modules are mounted onto a large, bulky structure made of various pipes connected together. Together, the pipes form a complex, heavy structure that orients the photovoltaic modules at an angle to the roof.

It would instead be desirable to form a simple, easy to set up system that supports an array of photovoltaic modules at an angle to the roof, yet works easily with the simple, flat geometry of the roof. Ideally, this mounting system would permit a fast set-up with minimal connecting hardware and parts used. Importantly as well, this ideal system must provide a water-tight seal such that any holes made into the roof to secure the system into place do not cause leakage. Ideally, the desired system should also compensate for the fact that different buildings have their rafters spaced at different distances apart from one another (assuming that it connects directly to the building's rafters).

As will be shown, the present system provides a fast, simple and easy to set up mounting system that is ideally suited for use on a flat roof (including, but not limited to) residential flat roof installs. The present system also connects directly to the building's rafters, yet provides exceptional sealing and support at these connection points such that water does not penetrate into the roof.

SUMMARY OF THE INVENTION

In preferred aspects, the present system provides a mounting system for solar modules made from a mounting beam having a first leg portion, a second leg portion and a center portion extending between the first and second leg portions. The second leg portion is longer than the first leg portion such that center portion is supported at an angle to the ground. (Ideally, this angle is 5 to 14 degrees, but it is to be understood that the present system encompasses other angles as well).

The first and second legs are secured to the building's rafters with fasteners that pass through the roof. Sealant may be applied to the bottom of these legs (to glue them to the roof) prior to inserting the fasteners. A receptacle is positioned around each of these fastener connection points. Preferably, the receptacle is assembled from a pair of pieces that lock together. The receptacle is then filled with sealant which hardens to form a water-tight seal around the bottom of the legs. The sealant fully covers the holes through which the fasteners pass into the roof (and a wide surrounding area). Advantageously, the sealant in the receptacle also helps secure the legs to the roof and also provides modest lateral support to the legs.

One advantage of the present system is that it can be attached to a roof by simple lag bolts, yet it provides a system for sealing and water-proofing the holes caused by these lag bolts entering the roof. Providing the water-proof seal between the roof and the mounting hardware is quick and easy.

Another advantage of the present system is that it can be secured to the building's rafters, while accommodating different rafter spacings. (In other words, the spacing between successive rafters need not match the spacing between the modules (or the width of the modules) themselves.

Other advantages of the present system are that it uses very low hardware cost, requires a very small number of parts, and uses standard fasteners, thereby requiring an installer to carry no non-standard tools. It also avoids the use of complex flashings or "pitch pocket" connections. Moreover, the present system has a short installation time. Also, the geometry of the mounting beam itself makes it stackable for high packing density and ease of transportation.

As will be shown, the geometry of its mounting beam provides a photovoltaic module angle that is optimized (e.g.: 5 to 14 degrees) such that the spacing between module rows in the array can be minimized.

BRIEF DESCRIPTION OF THE DRAWINGS

FIG. 4 is a top plan view of the mounting beam of the present system.

FIG. 5 is a perspective view showing receptacles received around the front and back legs of the mounting beam.

FIG. 6 is a perspective view of one of the receptacles prior to assembly.

DETAILED DESCRIPTION OF THE DRAWINGS

Figure 1:
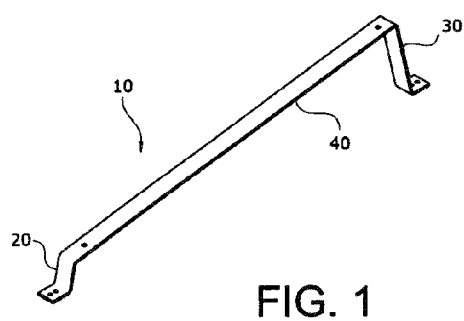
FIG. 1 is a front perspective view of the mounting beam of the present system.
Figure 2:
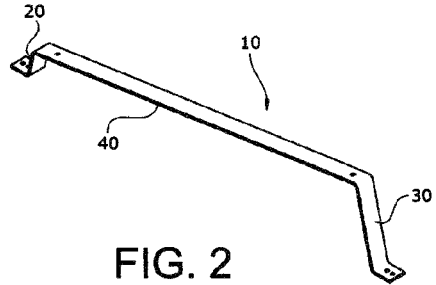
FIG. 2 is a rear perspective view of the mounting beam of the present system.
Figure 3:
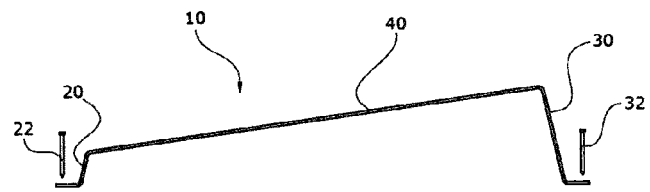
FIG. 3 is a side elevation view of the mounting beam of the present system.
Figure 7:
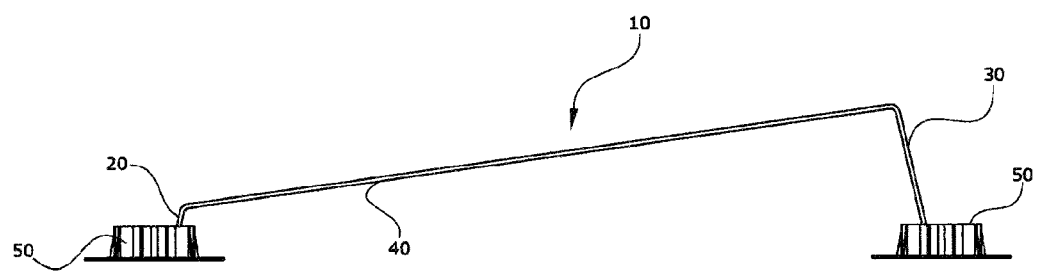
FIG. 7 is a perspective view showing the receptacles of FIG. 5, filled with sealant.
Figure 8:
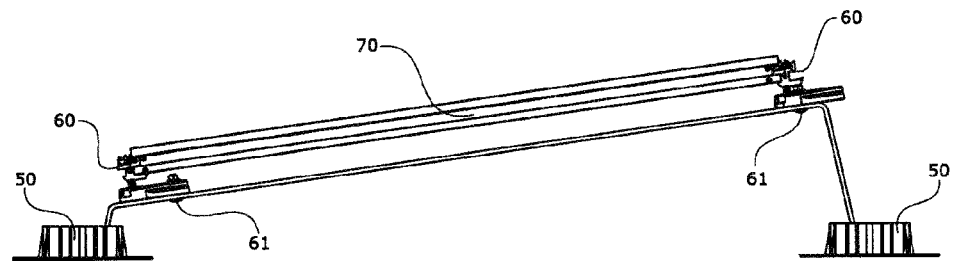
FIG. 8 is a side elevation view of a row of photovoltaic modules in an array of solar modules.
Figure 9:
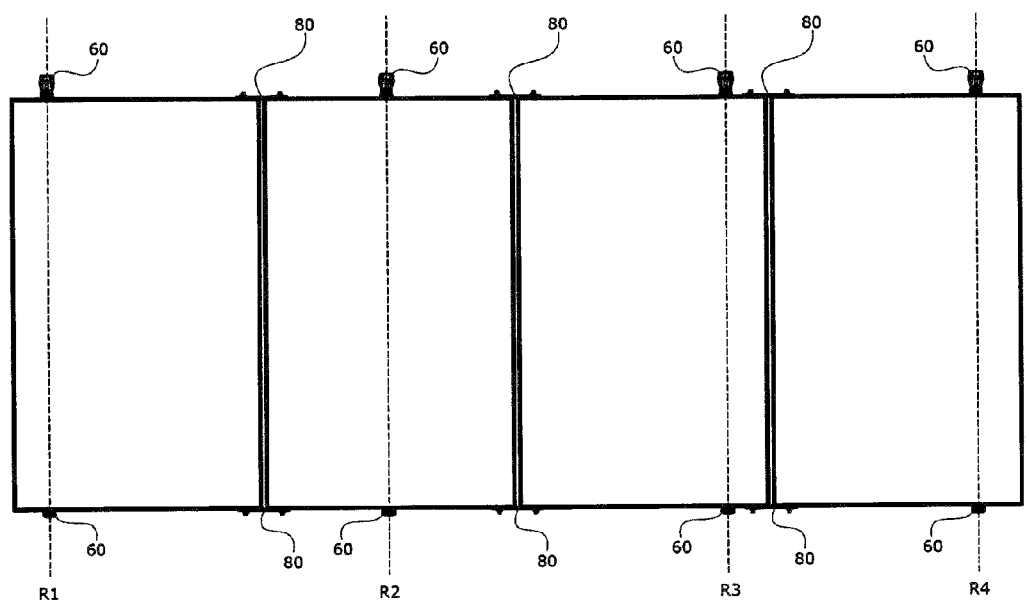
FIG. 9 is a top plan view of the row of photovoltaic modules seen in FIG. 8.
Figure 10:
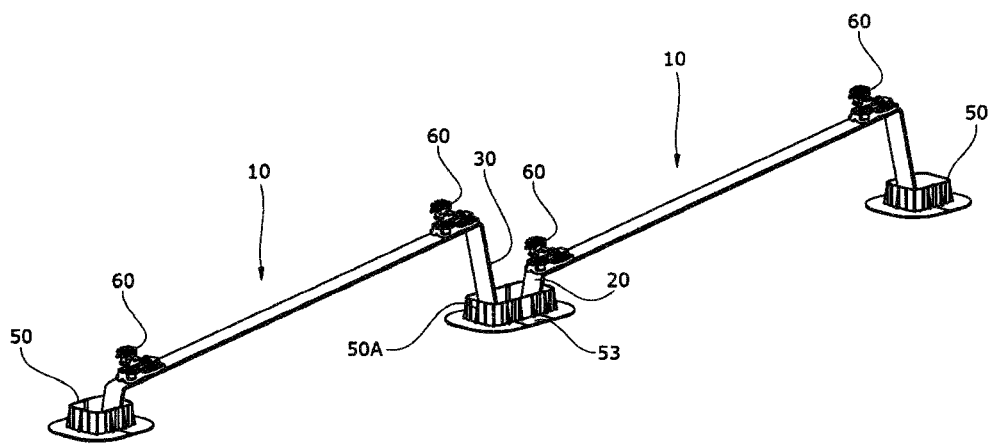
FIG. 10 is a perspective view showing legs from two mounting beams sharing the same receptacle.

FIGS. 1 to 4 show various views of the mounting beam that is used to provide a ramp mounting system for photovoltaic modules. FIGS. 5 to 7 show the use of sealant received into receptacles around the bottom of the legs to both anchor the mounting beam into position (so a photovoltaic module can be mounted thereto) and to provide a water-tight seal where the beam's fasteners pass through the roof and into the buildings rafters. FIG. 8 shows a side elevation view of the system supporting a photovoltaic module thereon. FIG. 9 shows a unique property and advantage of the present system in which a row of photovoltaic modules can be quickly and easily installed on a roof where the rafter spacing is different from the photovoltaic module width/spacing. Lastly, FIG. 10 shows the legs of two mounting beams sharing the same receptacle (when successive rows of mounting beams and photovoltaic panels are placed behind one another). Referring first to FIGS. 1 to 4, the present solar mounting system is assembled onto a plurality of mounting beams. FIGS. 1 to 4 show exemplary dimensions for one of these mounting beams 10. Mounting beam 10 may be a single continuous beam having a flattened profile that has been bent into a preferred shape (as shown) or it may be made of separate beams or elements fastened or otherwise secured together.

Mounting beam 10 has a first leg portion 20, a second leg portion 30 and a center portion 40. Second leg portion 30 is longer than first leg portion 20. As a result, center portion 40 is supported at an angle to the ground, as shown. (In preferred embodiments, the angle is from 5 to 14 degrees, but it is to be understood that the present invention encompasses all other angles as well).

Each leg is fastened to the roof. Specifically, a first fastener 22 passes through the bottom of the first leg portion 20, and a second fastener 32 passes through the bottom of the second leg portion 30. Fasteners 22 and 32 can be simple standard lag screws that pass through the roof and into the rafters of the building. Optionally, building sealant can be applied to the underside of the bottoms of legs 20 and 30, such that legs 20 and 30 are essentially glued onto the roof. Next, as seen in FIGS. 5, 6 and 7, receptacles 50 may be positioned around the bottom ends of legs 20 and 30. Receptacles 50 have an open bottom and (when assembled) form a wall that encircles the bottom ends of legs 20 and 30. FIG. 6 shows an exemplary receptacle 50 comprised of two hemispherical shaped portions 50A and 50B. Portions 50A and 50B are essentially mirror images of one another, but have a small locking groove 51/notch 52 that hold them together. Note: although receptacles 50 are illustrated as being circular, the present invention is not so limited. Other shapes and designs are also encompassed within the scope of the present invention.

After fasteners 22 and 32 have secured mounting beam 10 onto the roof, receptacles 50 are assembled around the bottoms of the legs. Sealant is then poured into receptacles 50. In preferred aspects of the invention, the sealant is simply a structural adhesive. For example, the sealant used may be M-1® Structural Adhesive Sealant made by Chem Link of Schoolcraft, Mich. It is to be understood, however, that other suitable sealants may be substituted. One advantage of using such a pourable sealant are that it eliminates the need for flashings or complex mechanical attachment systems.

When the sealant hardens, it forms a water-tight seal over the entire region where fasteners 22 and 32 attach mounting beam 10 to the roof of the building. (Note: during a typical installation, receptacle 50 will be placed around the bottoms of legs 20 and 30 prior to fasteners 22 and 32 being installed). Preferably as well, fasteners 22 and 32 may be simple lag bolts that pass through holes 23 and 33 in the bottoms of legs 20 and 30.

The advantage of using the sealant in receptacles 50 is that it entirely covers the fasteners 22 and 32 (and the holes they make into the roof). In addition, however, the sealant covers a much larger area, thereby providing leak protection over a large area. Moreover, the sealant also helps "glue" the bottoms of legs 20 and 30 to the roof. Also, by covering a relatively large area around fasteners 22 and 32, the sealant may also provide modest lateral support to the mounting beam 10 itself.

Next, FIG. 8 shows a side elevation view of a photovoltaic module positioned on the ramp formed by the mounting beam, as follows. Mounting beam 10 has a support foot 60 mounted near the opposite ends of the center portion of mounting beam 10. In one exemplary embodiment, the support foot 60 is a leveling foot made by Zep Solar of San Rafael, Calif. However, it is to be understood that other suitable module attachment and/or leveling mechanisms can be substituted, as desired, all keeping within the scope of the present invention. Support/leveling feet 60 can be secured by bolts 61 passing through holes 62 in mounting beam 10. Support/leveling feet 60 support opposite ends of photovoltaic modules 70.

Turning finally to FIG. 9, a unique attribute and advantage of the present invention is shown. Specifically, a row of photovoltaic modules 70 can be formed using approximately one mounting beam 10 for each photovoltaic module 70. Importantly, however, the spacing between successive mounting beams 10 can be made to match the spacing between successive rafters, regardless of the width of the photovoltaic modules 70.

Specifically, FIG. 9 shows successive mounting beams 10 positioned to align with the rafters R1, R2, R3 and R4 (shown in dotted lines). Thus, mounting beams 10 are positioned directly above rafters R, and are connected to the rafters by fasteners 22 and 32. In addition, the individual photovoltaic modules 70 can be secured together (side-by-side) by module-to-module interlocks 80. As can be seen, the side edges of photovoltaic modules 70 are not positioned in alignment with the rafters in the roof of the building. (This is because the spacing between the rafters R is different from the width/spacing of the photovoltaic modules 70. As a result, the spacing between successive module-to-module interlocks 80 in the array is different from the spacing between successive mounting beams 10. As such, the spacing between successive module-to-module interlocks 80 corresponds to the width of the photovoltaic modules 70 whereas the spacing between successive mounting beams 10 corresponds to the spacing between the rafters R in the roof. As can also be seen, support/leveling feet 60 are attached to photovoltaic modules 70 at different positions along the top and bottom edges of different photovoltaic modules.

An important advantage of the assembly shown in FIG. 9 is that only one mounting beam 10 needs to be used on average for each module 70 in the row regardless of the rafter spacing. Thus, connection points into the rafters are minimized—and rafter spacing and module width need not correspond to one another.

Lastly, FIG. 10 shows an embodiment of the present system in which a first leg 20 of one mounting beam and a second leg 30 of a second mounting beam share the same receptacle 50A. In this embodiment, receptacle 50A may have an optional center insert 53 to lengthen the size of the receptacle (such that both leg portions fit therein). This embodiment is beneficial when successive rows of photovoltaic modules are to be installed.

What is claimed is:

1. A mounting system for solar modules, comprising:
    (a) a mounting beam having a first leg portion, a second leg portion and a center portion extending between the first and second leg portions, wherein the second leg portion is longer than the first leg portion such that center portion is supported at an angle to the ground;
    (b) a first fastener at the bottom of the first leg portion, the first fastener configured to attach the first leg portion to the roof of a building;
    (c) a first receptacle encircling the first fastener and the bottom of the first leg portion;
    (d) sealant disposed within the first receptacle, wherein the sealant provides a water-tight seal over the region where the first fastener attaches to the roof of the building;
    (e) a second fastener at the bottom of the second leg portion, the second fastener configured to attach the second leg portion to the roof of a building;
    (f) a second receptacle encircling the second fastener and the bottom of the second leg portion; and (d) sealant disposed within the second receptacle, wherein the sealant provides a water-tight seal over the region where the second fastener attaches to the roof of the building.

2. The mounting system of claim 1, wherein the mounting beam is a single continuous beam.

3. The mounting system of claim 1, wherein the mounting beam is a flattened member with its opposite ends being bent downwardly into the shape of the first and second legs.

4. The mounting system of claim 1, wherein the first and second fasteners are lag bolts received through apertures in the bottom of the first and second legs.

5. The mounting system of claim 1, wherein the sealant in the first and second receptacles provides a water-tight seal around the bottoms of each of the first and second legs.

6. The mounting system of claim 1, further comprising sealant under the bottoms of the first and second legs, wherein the sealant attaches the bottoms of the first and second legs to the roof.

7. The mounting system of claim 1, wherein the receptacles are circular in shape.

8. The mounting system of claim 1, wherein the receptacles are assembled in sections around the bottoms of the first and second legs.

9. The mounting system of claim 1, wherein the center portion of the mounting beam is supported at an angle of 5 to 14 degrees to the ground.

10. The mounting system of claim 1, further comprising:
(e) a first leveling foot at one end of the center portion; and
(f) a second leveling foot at another end of the center portion.

11. The mounting system of claim 10, further comprising:
(g) a photovoltaic module mounted onto the first and second leveling feet.

12. An array of solar modules, comprising:
(a) a plurality of mounting beams, each mounting beam having a first leg portion, a second leg portion and a center portion extending between the first and second leg portions, wherein the second leg portion is longer than the first leg portion such that center portion is supported at an angle to the ground;
(b) fasteners at the bottom of each of the leg portions, the fasteners attaching each of the leg portions to the roof of a building;
(c) receptacles encircling the fasteners and the bottoms of the first and second leg portions;
(d) sealant disposed within the receptacles, the sealant providing water-tight seals over the regions where the fasteners attach to the roof of the building;
(e) support feet on the center portions of the mounting beams; and
(f) photovoltaic modules supported by the mounting feet on the center portions of the mounting beams.

13. The array of claim 12, wherein a first leg portion of a first mounting beam and a second leg portion of a second mounting beam share the same receptacle.

14. The array of claim 12, further comprising:
(g) module-to-module interlocks connecting adjacent photovoltaic modules together.

15. The array of claim 12, wherein the support feet are leveling feet.

16. The array of claim 12, wherein the mounting beams are positioned in alignment with rafters in the roof of a building such that the fasteners are received into the rafters.

17. The array of claim 16, wherein the side edges of the photovoltaic modules are not positioned in alignment with the rafters in the roof of the building.

18. The array of claim 12, wherein the support feet are attached to the photovoltaic modules at different positions along the top and bottom edges of different photovoltaic modules.

19. The array of claim 14, wherein the spacing between successive module-to-module interlocks in the array is different from the spacing between successive mounting beams.

20. The array of claim 19, wherein the spacing between successive module-to-module interlocks corresponds to the width of the photovoltaic modules whereas the spacing between successive mounting beams corresponds to the spacing between the rafters in the roof.

\* \* \* \* \*